(12) United States Patent
Olenick et al.

(10) Patent No.: US 6,711,762 B2
(45) Date of Patent: Mar. 30, 2004

(54) METHOD OF USING A TRUCK CAB BRIDGE BED

(75) Inventors: Michael J. Olenick, Naperville, IL (US); Mark S. Olenick, Chicago Ridge, IL (US); Craig W. Smith, Villa Park, IL (US)

(73) Assignee: KTK Services, Inc., Batavia, IL (US)

( * ) Notice: Subject to any disclaimer, the term of this patent is extended or adjusted under 35 U.S.C. 154(b) by 11 days.

(21) Appl. No.: 10/060,595

(22) Filed: Jan. 30, 2002

(65) Prior Publication Data

US 2003/0140415 A1 Jul. 31, 2003

(51) Int. Cl.[7] ............................................. A47C 17/64
(52) U.S. Cl. ........................ 5/118; 5/627; 296/192.22; 297/63
(58) Field of Search .............................. 297/63; 5/118, 5/701, 659, 719, 236.1, 239, 240, 625–627, 691, 420; 296/190.02, 69

(56) References Cited

U.S. PATENT DOCUMENTS

| | | | | |
|---|---|---|---|---|
| 137,718 A | * | 4/1873 | Pullinger | 5/236.1 |
| 722,456 A | * | 3/1903 | Reeves | 5/627 |
| 1,620,346 A | * | 3/1927 | Harper | 5/118 |
| 1,659,887 A | | 2/1928 | McLean | |
| 2,309,464 A | * | 1/1943 | Lucci et al. | 5/628 |
| 2,587,291 A | | 2/1952 | Des Rochers | |
| 2,616,098 A | * | 11/1952 | Love | 5/118 |
| 2,638,606 A | * | 5/1953 | Austin | 5/239 |
| 3,280,515 A | * | 10/1966 | Eriksson | 5/659 |
| 3,353,194 A | * | 11/1967 | Matson | 5/118 |
| 4,186,456 A | | 2/1980 | Huempfner | |
| 4,232,413 A | * | 11/1980 | Mongault | 5/94 |
| 4,443,034 A | | 4/1984 | Beggs | |
| 4,487,451 A | | 12/1984 | Fiorini | |
| 4,908,887 A | * | 3/1990 | Shaw, Jr. | 5/419 |
| 4,922,562 A | * | 5/1990 | Allred et al. | 5/627 |
| 4,977,631 A | | 12/1990 | Bretz | |
| 5,170,521 A | | 12/1992 | Light | |
| 6,470,517 B1 | * | 10/2002 | Kang | 5/118 |

FOREIGN PATENT DOCUMENTS

| | | |
|---|---|---|
| DE | 29706559 | 6/1997 |
| EP | 0388380 | 9/1990 |
| FR | 1580231 | 9/1969 |

* cited by examiner

Primary Examiner—Michael F. Trettel
(74) Attorney, Agent, or Firm—Piper Rudnick LLP

(57) ABSTRACT

A bed is provided for a vehicle with two adjacent seats separated from each other so that a gap is defined therebetween. The bed has a body that includes a first end disposed on one seat and a second disposed on the other seat. The bed bridges the gap between the seats. The width of the body is adjustable for fitting on the seats.

18 Claims, 3 Drawing Sheets

METHOD OF USING A TRUCK CAB BRIDGE BED

TECHNICAL FIELD

The present invention relates generally to beds in truck cabs, and more particularly to beds that bridge separated front seats of a truck cab.

BACKGROUND OF THE INVENTION

Truck drivers frequently wait long hours in their trucks for the truck to be loaded or unloaded. For trucks with back bench seats, sleeping quarters or compartments with beds or cots, the driver can comfortably rest while waiting for the loading/unloading of the truck. An example of such a bed is disclosed by U.S. Pat. No. 4,977,631 issued to Bretz.

In smaller truck cabs that do not have a back seat or sleeping compartment, however, the driver has no choice but to stay in the front driver's seat or front passenger seat if the driver desires to wait in his truck. Frequently, the passenger and driver seats in a truck are split bucket-type seats instead of a single bench seat. These split seats are typically separated by a gap to accommodate a gear shift. With this configuration, a driver has no choice but to remain in the seated position. However, it is difficult to rest or sleep in this position. In addition, the seated position may require the driver to maintain his limbs in positions which cause stiffness or aching. The driver cannot recline on the split front seats because it is difficult and uncomfortable for a person to recline by balancing over the two seats.

One solution is to provide a hammock in the front seat, such as that shown in U.S. Pat. No. 5,170,521 issued to Light. This system, however, requires relatively expensive permanent and complicated hardware to hang the hammock from the truck cab frame.

Another known solution is to simply lie a board of wood, such as a piece of plywood, over the two front seats for the driver to recline upon. This bed-board, however, is large, rigid, and cumbersome. Therefore, it is difficult to place the bed-board into the truck cab and onto the front seats of the truck cab. The bed-board also is not adaptable from truck cab to truck cab of different sizes. For instance, the bed-board may be too wide to fit onto some truck cabs due to the space provided between the seat backs and the dash board or steering wheel. The board may also be too wide to avoid the gear shift, which requires some sort of notch cut in the bed-board so the bed-board fits around the gear shift. The bed-board also cannot be collapsed for easy storage and transport. Such concerns are significant, particularly in the case of day cabs. A day cab driver may not be assigned to the same truck the following day. Further, the bed-board is a personal solution thereby compounding the lack of versatility issue.

In addition, it is convenient for the drivers to simply keep the bed-board in the truck cabs instead of carrying the bed-board out of the truck cab in their off hours. If trucks are switched to different drivers or brought to maintenance personnel for upkeep, the bed-boards are frequently discarded as trash. Presumably, the purpose of the simple wood bed-board is not immediately apparent to the maintenance personnel.

Thus, the main object of the present invention is to provide an improved bed for split adjacent seats in a vehicle that provides adequate comfort for rest or stretching out ones limbs.

Another object of the present invention is to provide an improved bed for split adjacent seats in a vehicle that is adjustable to fit many different sizes of seats and vehicles.

Yet another of the present invention is to provide an improved bed for split seats in a vehicle that is collapsible for easy storage and transport.

SUMMARY OF THE INVENTION

In one aspect of the present invention, the problems mentioned above are solved by a bed for a vehicle with two adjacent seats separated from each other so that a gap is defined therebetween. The bed has a body that includes a first end disposed on one seat and a second end disposed on the other seat. The bed bridges the gap between the seats, and the width of the body is adjustable for fitting on the seats.

In another aspect of the present invention, the bed has a body with a plurality of rods and a flexible platform defining pockets for receiving the rods and for maintaining the rods in a generally parallel relation to each other. With this structure, the flexible platform provides a flexible width for fitting the bed on the seats and avoiding any gear shift that may be present between the seats of the truck cab.

This flexibility is accomplished by providing each rod with a wide range of lateral or transverse positions relative to an adjacent rod. When the flexible platform is made of a fabric that is folded in two layers to define the pockets for receiving the rods, the flexible platform can be folded, rolled or otherwise moved to form any outer width for the body or bed. This allows for instantaneous adjustment of the bed's width to fit any seat as well as the ability to be compacted for easy storage and transport.

BRIEF DESCRIPTION OF THE DRAWINGS

The above mentioned and other features of the present invention and the manner of obtaining them will be apparent, and the invention itself will be best understood by reference to the following description of the preferred embodiment of the invention in conjunction with the following drawings, in which.

DETAILED DESCRIPTION OF THE PREFERRED EMBODIMENT

Figure 1:
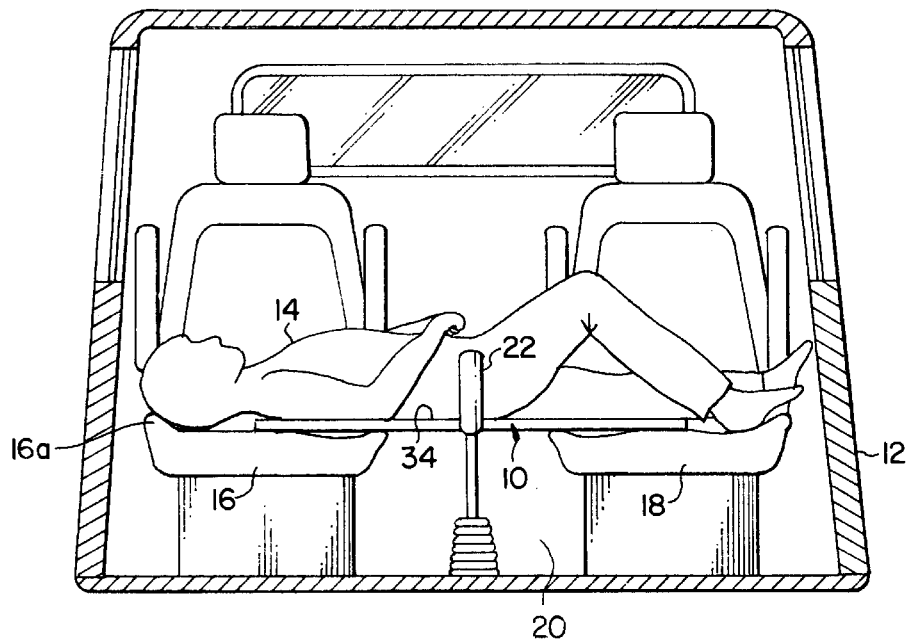
FIG. 1 is a cross-section of a truck cab showing the bed of the present invention placed on seats of the truck cab.

Referring to FIG. 1, a bed 10 is disposed in a vehicle, such as a truck cab 12 of a truck so that a driver 14 can recline on the bed to sleep, rest or stretch his limbs on the front seats of the truck cab 12 while waiting for the truck to be loaded or unloaded. The front seats include a passenger seat 16 separated from a driver's seat 18 by a gap 20. A gear shift 22 is typically disposed between the seats 16, 18.

The bed 10 provides support for a driver's back so that the driver can comfortably rest his head on a raised portion 16a of the passenger seat 16, while resting his feet on the driver's seat 18 (or vis-à-vis). The bed 10 is easy to place on the seats 16, 18 as well as easy to remove from the seats. The bed 10 can also be positioned to avoid the gear shift 22.

Figure 2:
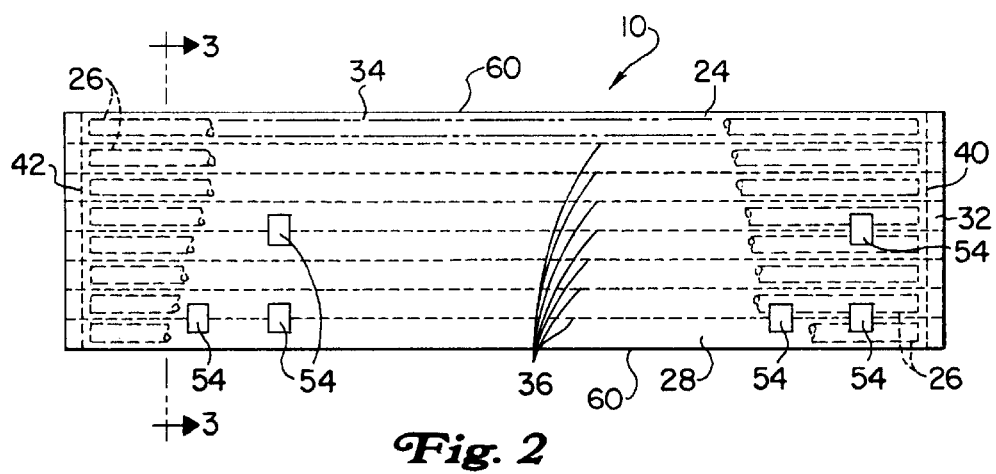
FIG. 2 is a top view of the bed in accordance with the present invention.
Figure 3:
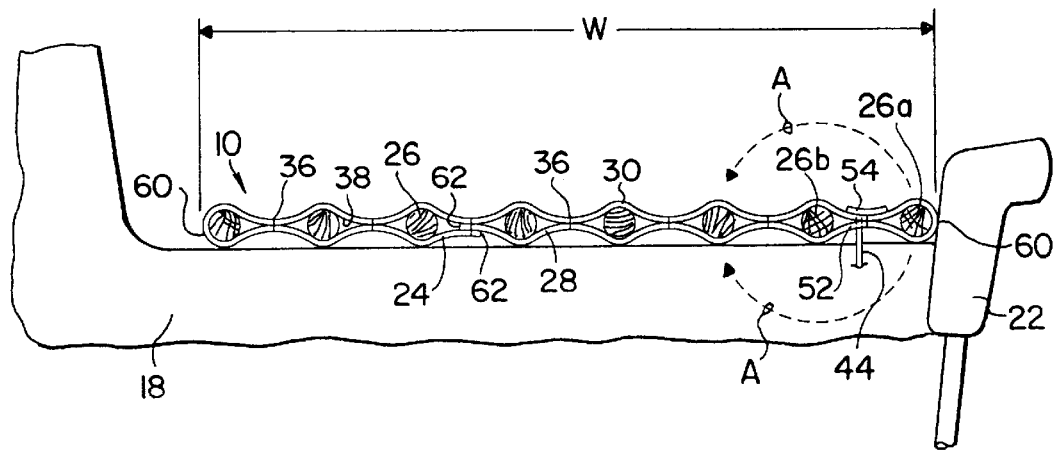
FIG. 3 is a cross-section of the bed along line 3—3 in FIG. 2, and also showing the bed in position on a seat and adjacent a gear shift in accordance with the present invention.
Figure 4:
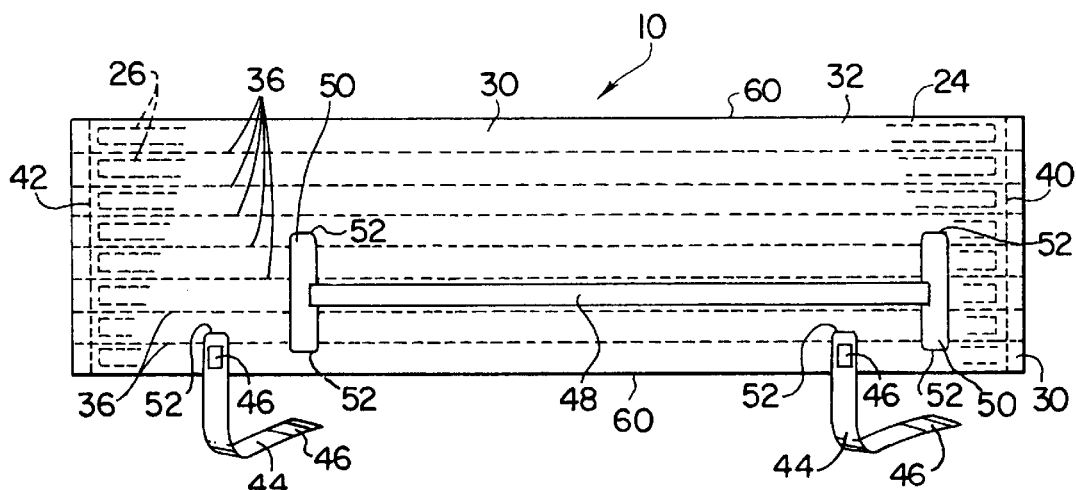
FIG. 4 is a bottom view of the bed in accordance with the present invention.

Referring to FIGS. 2–4, the preferred configuration for the bed 10 has a body 24 composed of a plurality of rods 26 disposed in a flexible platform 32 made of a material such as a fabric. The flexible platform 32 has two layers 28, 30 that are sewn together to enclose the rods 26 in generally parallel relation to each other. The rods 26 act as beams to form a bridge from seat to seat (i.e. span the gap between the seats 16, 18) while the layers 28, 30 indirectly attach the rods 26 to each other, provide the actual surface 34 that a driver 14 reclines upon and provides flexibility to instantly change an outer width (shown in FIG. 3) of the flexible platform 32.

For the typical bucket seats with 15" to 18" widths, it has been found that eight-⅞" diameter wooden rods spaced at 1½" on center is adequate. The rods 26 are preferably 48" long to span a typical 20"–28" gap between front truck cab seats. With this length, the rods 26 are long enough to adequately support the weight of a driver 14 while being short enough to provide room on the seats 16 or 18 for the driver to rest his head on an edge cushion portion 16a of the seat 16 that is typical of bucket-type seats. When a small gap is present between the seats 16, 18, the rods 26 can be positioned so that a longer portion rests in the seat 18 that support the driver's feet to ensure the cushion portion 16a remains unobstructed to support the driver's head.

It will be appreciated that the rods 26 may be made of plastic, steel, bamboo or any other suitable material strong enough to support the weight of a human being. However, steel has been found to be too heavy and certain plastic is not sufficiently rigid. It will also be appreciated that the rods 26 may have any length adequate to span gap 20 while supporting the weight of a person without failing or buckling.

The flexible platform 32 is preferably a single piece of fabric, such as cotton or polyester, or a flexible fabric-like plastic for high durability and easy maintenance. The platform 32 is folded over to form the two layers 28, 30. The layers 28, 30 are then sewn together by parallel stitching 36 at 1½" spacing to form separate elongated pockets 38 that receive the rods 26; here seven lines of parallel stitching 36 are required to enclose eight rods 26. The lateral sides 60 are preferably formed by the folding of the fabric of the flexible platform 32 and, therefore, do not need to be sewn in the preferred embodiment. The actual lateral ends 62 of the fabric used to form the flexible platform 32 are sewn together at one of the parallel stitching lines 36 as shown in FIG. 3. Longitudinal end stitching 40, 42, performed after the rods 26 are placed in the pockets 38, secures the rods 26 between the layers 28, 30. In order to perform the stitching 40,42 at the longitudinal ends, the flexible platform 32 must be slightly longer than the rods 26 to provide space for the stitches.

Referring to FIG. 3, with this structure the width of the body 24 is selectively and instantaneously adjustable to fit any seat width and to avoid the gear shift 22. As shown by the dashed arrows A, any single rod 26a has an approximately 360 degree outer range of lateral or transverse positions relative to an adjacent rod 26b. It will also be appreciated that since arrow A shows the outer range of positions, the rod 26a could be positioned closer to adjacent rod 26b anywhere within the circle created by arrows A. This includes moving the rods 26 laterally and closer to each other, instead of folding/rolling the rods over each other, to change the width W without changing the order of the rods 26. This flexibility is provided by either the flexibility of the material of the flexible platform 32, the pockets 38 being larger than the cross-sectional areas of the rods 26 so that the rods are provided further freedom to move laterally within the pockets or both.

The lateral/transverse range of positions for the rods is available between any adjacent rods 26 although it requires that the flexible material 32 be folded, rolled or otherwise moved to permit such positioning. With this range of positions provided, it is simple to adjust the width W by reconfiguring flexible material 32 accordingly by moving rods 26 laterally, folding the flexible material 32 or rolling it to the desired width in order to fit the bed 10 on the seats 16, 18 and to avoid the gear shift 22.

Figure 5:
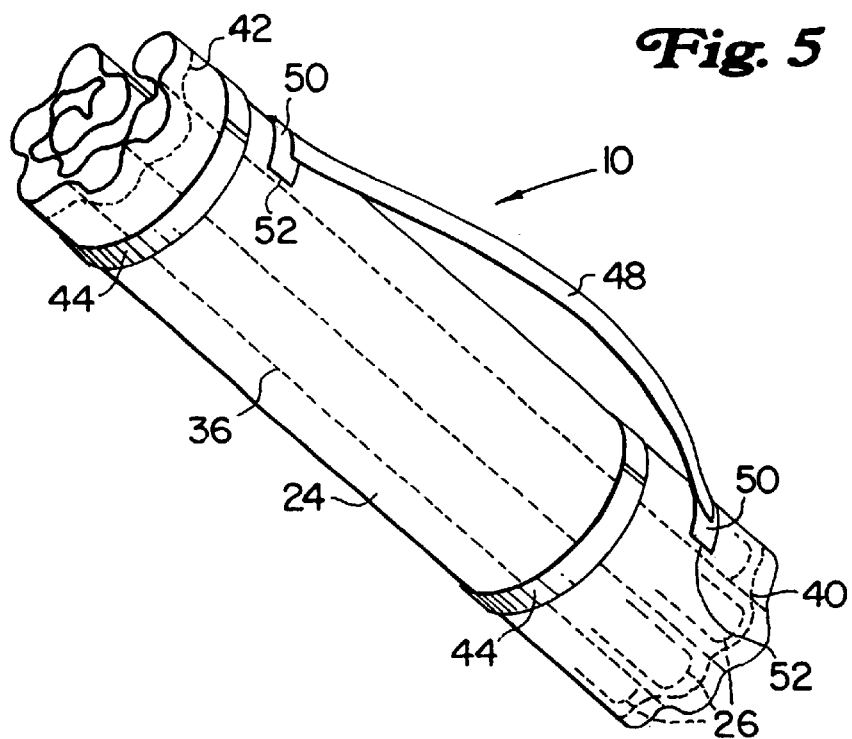
FIGS. 5 and 6 are perspective views showing the bed rolled-up for storage or transport in accordance with the present invention.

Referring to FIG. 5, the rods 26 and flexible platform 32 also make it possible to roll up the entire body 24, fold it in accordion fashion or in any other way to compact or collapse the body for easy storage and transport.

Referring to FIGS. 2–4 and 5, when the bed 10 is rolled up or collapsed, tie straps 44 can be wound around the body 24 and secured by any known means, such as VELCRO® brand hook and loop fastener pads 46 or metal snap fasteners (not shown). Once the bed 10 is secured in the collapsed configuration (shown in FIG. 5), it can be carried by handle 48, which is attached at its ends to support straps 50. In one embodiment, the tie straps 44 and support straps 50 are attached to the body 24 through slits 52 and secured by anchor knots 54 (shown in FIGS. 2–3) at the ends of the straps 44, 50. The straps 44, 50 are of any known material for such purposes such as plastic or fabrics such as nylon.

Figure 6:
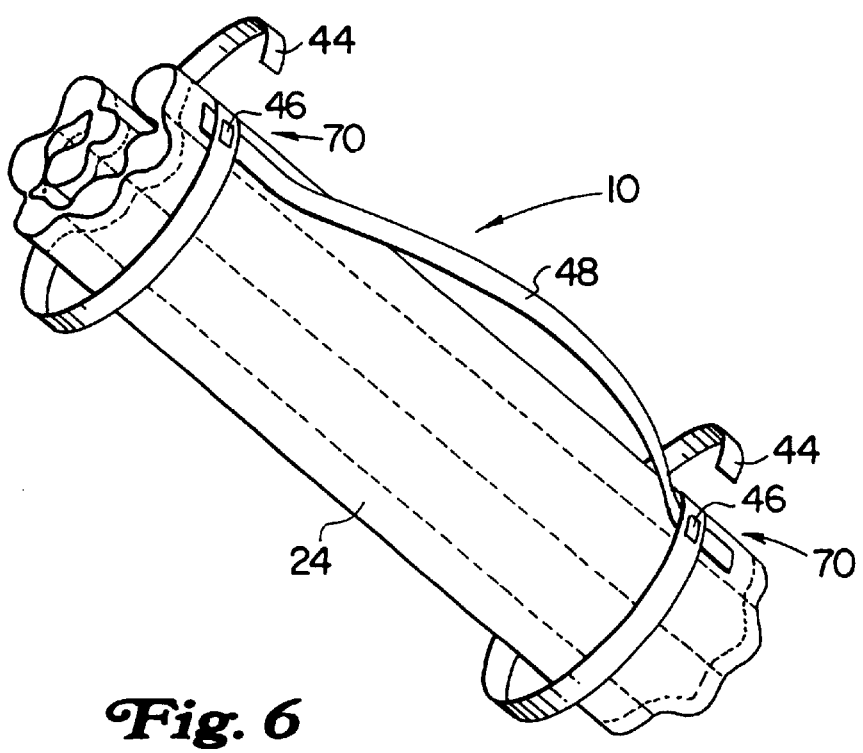

Referring to FIG. 6, a more preferred configuration attaches the handle 48 directly to the tie straps 44 rather than attached to separate support straps 50. With this configuration, only two separate attachment areas 70 are required rather than six attachments (six slits and six anchor units) as required by the configuration shown in FIG. 5. Here, one end of each tie strap 44 is sewn to an end of the handle 48, and the end of the handle 48 is thereby sewn to the body 24. Instead of sewing to the body 24, however, the same slit and anchor unit arrangement can be used at the ends of either the handle 48 or tie straps 44. VELCRO® brand hook and loop fastener pad 46 can also be placed at attachment area 70.

The bed 10 is easy to place in the vehicle 12. A driver merely unties the straps 44 and unfolds the bed 10 to the desired width on the front seats 16, 18. The process is reversed to remove the bed. Once the bed 10 is rolled up and the straps are secured to remove the bed 10, the driver can simply carry the bed by the handle 48 out of the truck cab 12 or store the rolled-up bed in a storage compartment in the truck cab.

It will be appreciated that in another alternative to rods 26, any generally parallel beam structure that spans the gap between separate seats may be used to form the flexible platform as long as the system attaching these parallel structures to each other provides some lateral or transverse flexibility so that at least the width of the body may be instantly adjusted or reduced to fit any vehicle seat or chair. It is also preferred that the body is flexible enough or has a folding structure so that it may be folded or rolled in some manner to compact the bed for convenient storage and transport of the bed. This may include elongated flat plates that are attached to each other by hinges on their lateral edges and fold in accordion fashion.

It will also be appreciated that the bed can be used with any two adjacent, separate seats, whether bucket seats or bench-type seats. This includes any vehicle with a split seat or even on adjacent chairs that are not in a vehicle.

The advantages of the present bed are now apparent. The bed 10 has a body 24 with parallel structures or rods 26 disposed between two layers 28, 30 of a flexible platform 32. The flexible platform 32 maintains the rods 26 in parallel relation while providing a wide range of lateral or transverse positions for the rods. This structure provides for instantaneous and simple adjustment of the width of the body 24 as well as convenient compaction of the bed 10 for transport and/or storage.

While various embodiments of the present invention have been described, it should be understood that other modifications and alternatives can be made without departing from the spirit and scope of the invention, which should be determined from the appended claims.

We claim:

1. A method of using a bridge bed in a vehicle with two adjacent seats separated from each other so that a gap is defined therebetween, said method comprising the steps of:

placing a first end of a body, of a bridge bed, on one of the seats;

placing a second end of said body on the other seat wherein said body bridges the gap defined between said seats; and adjusting a width of said body for fitting said body on said seats to the maximum said width possible in space provided by said seats on a specific vehicle.

2. The method of claim 1, wherein said seats have seat backs and the vehicle has a gear shift extending upward generally between said seats and in a vicinity of said gap, and wherein said adjusting said width of said body includes adjusting said body on said seats between said seat backs on one side of said body and said gear shift on another side of said body.

3. The method of claim 1, wherein said adjusting said width includes adjusting said body so that it lays generally flat.

4. The method of claim 1, wherein placing said ends of said body includes placing rods disposed within pockets defined by said body on said seats and laying said rods in a generally parallel array.

5. The method of claim 1, further comprising the step of a user reclining on said body.

6. The method of claim 1, further comprising the step of collapsing said body by bending said body into a transportable configuration, said bending performed by at least one from the group consisting of rolling, folding and both of said body.

7. The method of claim 1, wherein said adjusting of said width includes bending a flexible platform formed of two layers defining pockets therebetween, said pockets receiving an elongated rod, said adjusting changing the positions of said rods relative to each other.

8. The method of claim 7, wherein said layers are layers of fabric sewn with stitching generally parallel to said rods and between each adjacent pair of rods for maintaining said rods in said parallel relation and for providing a lateral range of positions for each rod relative an adjacent rod.

9. The method of claim 8, wherein adjusting said width includes one of (a) moving adjacent said rods laterally closer or farther apart to each other and (b) folding said flexible platform over itself to change a lateral position of said rods.

10. The method of claim 1, comprising the further step of folding said body accordion style.

11. The method of claim 1, comprising the further step of rolling said body and securing it in a rolled position with straps fixed to said body.

12. The method of claim 1, wherein the seats have distal raised edge portions, and wherein said step of placing said ends includes placing said body to extend across a substantial portion of the seats but not at least one raised portion of one of the seats, whereby said raised portion is used as a pillow by the user.

13. The method of claim 1, further comprising the step of holding the weight of a user on said body by said body's ends supported by the seats so that a user reclining on said body is held over said gap.

14. The method of claim 1, wherein the step of adjusting the width includes the step of unfolding the body.

15. A method of using a bed for a truck cab, comprising the steps of:

placing a first end of a body on a passenger seat adjacent to, and separated by a gap from, a driver's seat, said body having a plurality of rods in said body and a flexible platform defining pockets for receiving said rods, said placing said first end of a body including placing first ends of said rods on said passenger seat;

placing a second end of said body on said driver's seat by placing second ends of said rods on said driver's seat;

maintaining said rods in a generally parallel relation to each other and spanning said gap; and adjusting a flexible width of said body provided by said flexible platform for fitting the bed at a maximum possible width for said bed between a gear shift extending between the passenger seat and the driver's seat in a vicinity of said gap and seat backs of said seats.

16. The method of claim 15, wherein adjusting said width includes one of (a) moving adjacent said rods closer or farther from each other, (b) folding said flexible platform over itself to change a lateral position of said rods, and (c) both.

17. The method of claim 15, wherein said flexible platform includes two layers of a fabric for defining said pockets between said layers.

18. A method of using a bed in a vehicle with a driver's seat separated from an adjacent passenger seat by a gap, comprising the steps of:

spanning a body having a plurality of rods over the gap between said seats, said body having a flexible platform maintaining said rods in a generally parallel relation and providing each said rod a range of lateral positions relative on adjacent rod, said flexible platform including a folded piece of fabric defining two layers, said layers defining pockets for receiving said rods between said layers; and wherein adjusting an outer width of said body by changing lateral positions of said rods on said seats.

\* \* \* \* \*